US010627771B2

(12) United States Patent
Ichikawa et al.

(10) Patent No.: US 10,627,771 B2
(45) Date of Patent: Apr. 21, 2020

(54) INFORMATION PROCESSING EQUIPMENT HAVING A HARD KEY THAT IS PROVIDED SEPARATELY FROM A CONSOLE PANEL AND THAT IS INACCESSIBLE WITH THE CONSOLE PANEL IN A CLOSED STATE

(71) Applicant: KONICA MINOLTA, INC., Chiyoda-ku, Tokyo (JP)

(72) Inventors: Yoshitada Ichikawa, Okazaki (JP); Hideyuki Nukumi, Aichi-ken (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/900,297

(22) Filed: Feb. 20, 2018

(65) Prior Publication Data

US 2018/0246463 A1 Aug. 30, 2018

(30) Foreign Application Priority Data

Feb. 27, 2017 (JP) ................................ 2017-034676

(51) Int. Cl.
*G03G 21/16* (2006.01)
*G03G 15/00* (2006.01)
*H04N 1/00* (2006.01)
*G06F 3/12* (2006.01)
*G06F 3/0488* (2013.01)

(52) U.S. Cl.
CPC ..... *G03G 21/1633* (2013.01); *G03G 15/5016* (2013.01); *G06F 3/1231* (2013.01); *H04N 1/00384* (2013.01); *H04N 1/00474* (2013.01); *G06F 3/04886* (2013.01); *H04N 1/00392* (2013.01); *H04N 1/00493* (2013.01); *H04N 1/00496* (2013.01)

(58) Field of Classification Search
CPC .......... G03G 21/1633; G03G 15/5016; H04N 1/00384; H04N 1/00493; H04N 1/00496
USPC ............................ 358/3.32, 1.13; 399/11, 13
See application file for complete search history.

(56) References Cited

U.S. PATENT DOCUMENTS

| 4,649,403 A | 3/1987 | Miura |
| 5,202,726 A | 4/1993 | McCulley et al. |
| 7,894,738 B2 | 2/2011 | Muraki |

(Continued)

FOREIGN PATENT DOCUMENTS

| EP | 3267306 A1 | 1/2018 |
| JP | 2007041507 A | 2/2007 |

(Continued)

OTHER PUBLICATIONS

Extended European Search Report (EESR) dated May 24, 2018 issued in counterpart European Application No. 18158337.8.

(Continued)

*Primary Examiner* — Jamares Q Washington
(74) *Attorney, Agent, or Firm* — Holtz, Holtz & Volek PC

(57) ABSTRACT

Information processing equipment includes: a main body housing unit; and a console panel provided at the main body housing unit, the console panel having a front surface which has a display unit visible on the main body housing unit and does not include at least a hard key for switching an operation mode to a maintenance mode, the hard key being provided on a surface other than the front surface of the console panel.

18 Claims, 12 Drawing Sheets

(56) References Cited

U.S. PATENT DOCUMENTS

| | | |
|---|---|---|
| 2008/0044197 A1* | 2/2008 | Muraki .............. G03G 15/5016 399/81 |
| 2008/0089017 A1 | 4/2008 | Yamada et al. |
| 2009/0296127 A1* | 12/2009 | Kasamatsu ........ H04N 1/00307 358/1.13 |
| 2011/0173250 A1 | 7/2011 | Sato |
| 2017/0364313 A1 | 12/2017 | Iwamoto |
| 2018/0013905 A1 | 1/2018 | Kuroki et al. |

FOREIGN PATENT DOCUMENTS

| | | |
|---|---|---|
| WO | 2007004402 A1 | 1/2007 |
| WO | 2011016340 A1 | 2/2011 |
| WO | 2016163317 A1 | 10/2016 |

OTHER PUBLICATIONS

European Office Action dated Feb. 28, 2019 issued in counterpart European Application No. 18158337.8.
Chinese Office Action dated Jun. 3, 2019 (and English translation thereof) issued in counterpart Chinese Application No. 201810154416.7.
European Office Action dated Oct. 24, 2019 issued in counterpart European Application No. 18158337.8.
Chinese Office Action dated Jan. 9, 2020 (and English translation thereof) issued in Chinese Application No. 201810154416.7.

* cited by examiner

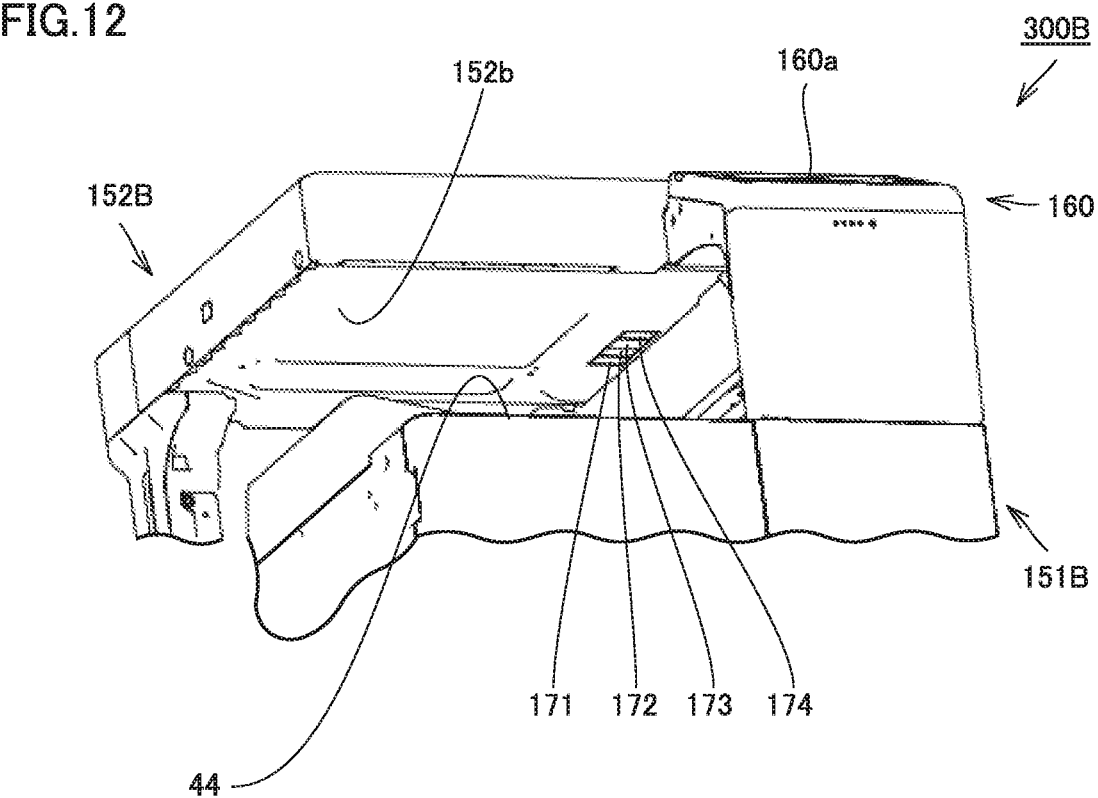

INFORMATION PROCESSING EQUIPMENT HAVING A HARD KEY THAT IS PROVIDED SEPARATELY FROM A CONSOLE PANEL AND THAT IS INACCESSIBLE WITH THE CONSOLE PANEL IN A CLOSED STATE

The entire disclosure of Japanese Patent Application 2017-034676, filed on Feb. 27, 2017, is incorporated herein by reference in its entirety.

BACKGROUND

Technological Field

The present invention relates to information processing equipment in which a console panel is provided at a main body housing unit.

Description of the Related Art

For example, Japanese Laid-Open Patent Publication No. 2007-041507 discloses an image formation apparatus as conventional equipment.

In the image formation apparatus disclosed in Japanese Laid-Open Patent Publication No. 2007-041507, a console panel is assembled to an upper side of a main body housing unit variably in angle for installation. Tilt switches are provided on both of the front and back surfaces of the console panel. By pressing a tilt switch provided on the front surface, the console panel pivots so that the lower end side of the console panel approaches the main body housing unit. By pressing a tilt switch provided on the back surface, the console panel pivots so that the lower end side of the console panel moves away from the main body housing unit. Thus providing a plurality of tilt switches on the console panel enhances the console panel in operability. Further, Japanese Laid-Open Patent Publication No. 2007-041507 describes that the console panel is provided with various types of hard keys.

SUMMARY

In general, various types of hard keys provided on a front surface of a console panel of an image formation apparatus includes numerical keypads or the like used by a user, and in addition, a hard key used by an operator for operation when the apparatus is shipped from a factory, installed and undergoes maintenance. For example, by pressing and thus holding the hard key for operation, a normal printing mode is switched to a maintenance mode or the like.

If the user erroneously operates the hard key for operation, an operation mode may be changed to an unintended operation mode and image formation can no longer be performed. In addition, it is necessary to change again the changed operation mode to the normal printing mode, which is inconvenient.

Further, an image formation apparatus is installed in a room such as an office, and it is easily noticed. In particular, a front surface of a console panel on which a console surface is provided is always watched by the user, and it has also been required to be improved in designability.

The present invention has been made in view of the above issues, and an object of the present invention is to provide information processing equipment capable of improving designability while suppressing an erroneous operation done by a user.

To achieve at least one of the above mentioned objects, according to an aspect of the present invention, information processing equipment reflecting one aspect of the present invention comprises: a main body housing unit; and a console panel provided at the main body housing, unit, the console panel having a front surface which has a display unit visible on the main body housing unit and does not include at least a hard key for switching an operation mode to a maintenance mode, the hard key being provided on a surface other than the front surface of the console panel.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 12 is a perspective view showing a back surface side of an image reading unit in the information processing equipment according to the second embodiment.

DETAILED DESCRIPTION OF EMBODIMENTS

Hereinafter, one or more embodiments of the present invention will be described with reference to the drawings. However, the scope of the invention is not limited to the disclosed embodiments. In the following embodiments, identical or common components are identically denoted in the figures and will not be described redundantly.

while in the embodiments described below, equipment in which an image formation apparatus and a server device are integrated together will be described as information processing equipment, the information processing equipment is not limited thereto, and it may be an image formation apparatus or an image processing device which does not have an image formation unit, as will be described hereinafter.

In the figures, arrows U and D indicate an upward and downward direction, arrows L and R indicate a rightward and leftward direction of the information processing equipment, and arrows Fr and Re indicate a frontward and rearward direction of the information processing equipment.

(First Embodiment)

Figure 1:
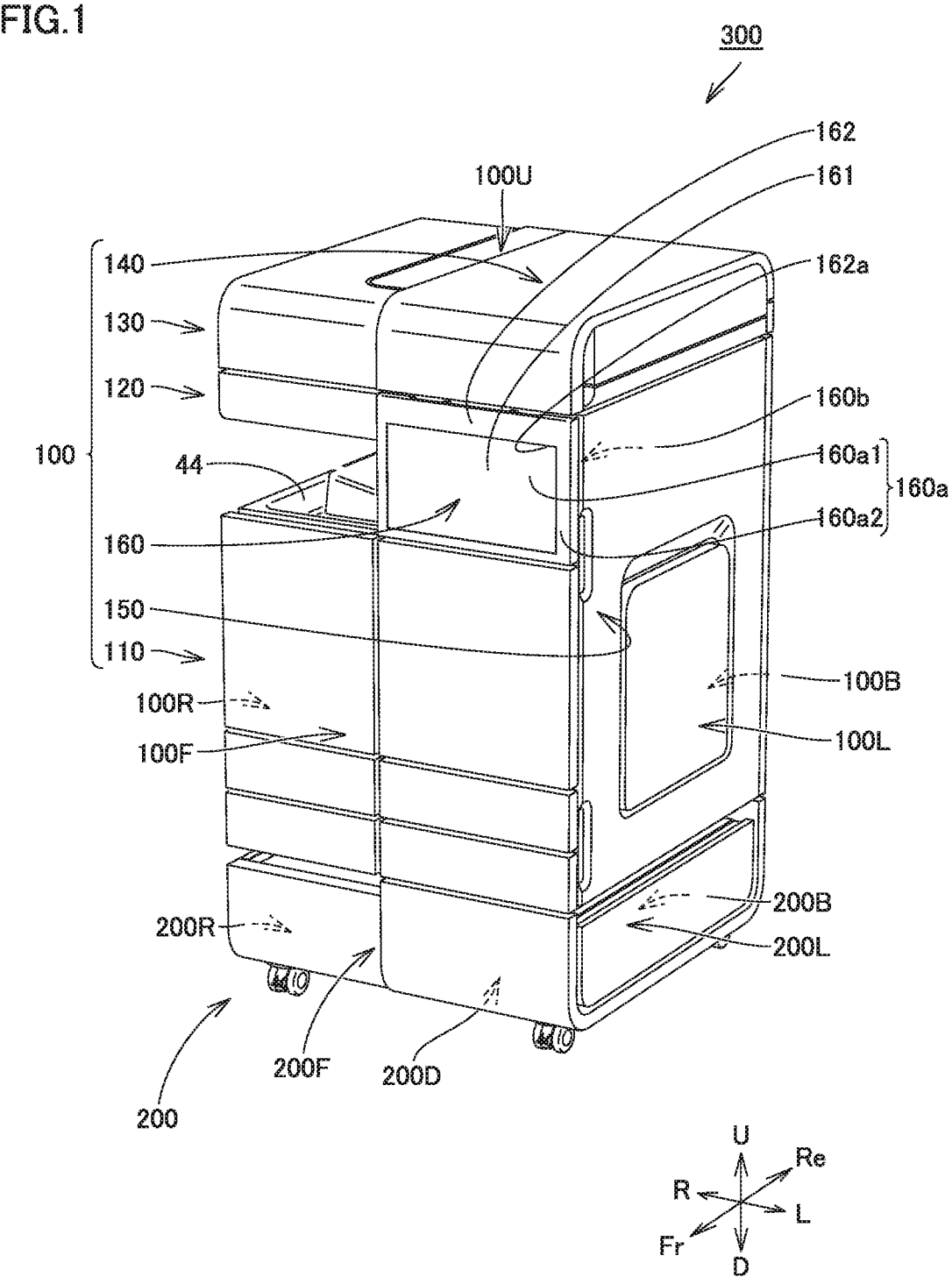
FIG. 1 is a perspective view showing information processing equipment according to a first embodiment.
Figure 2:
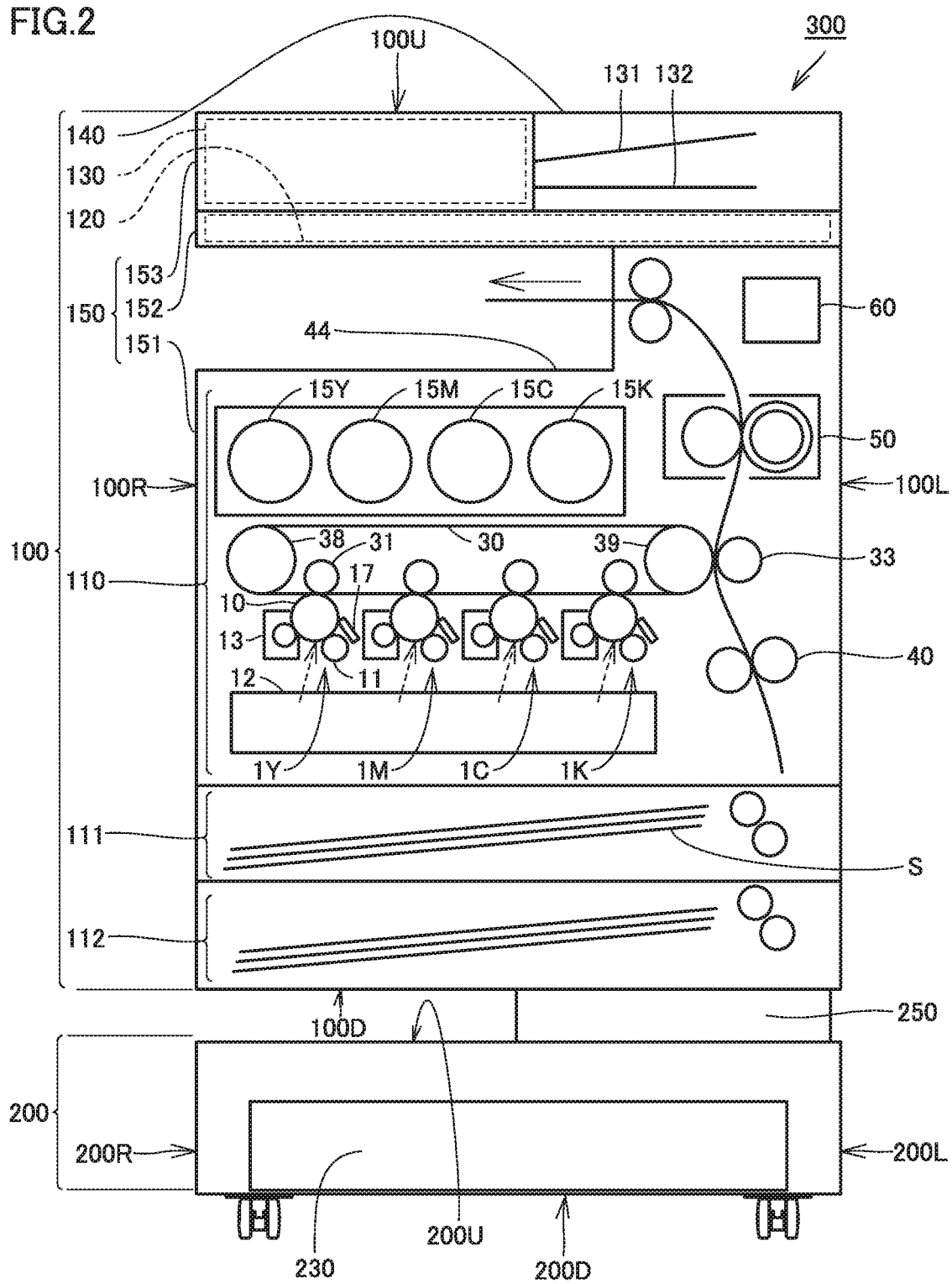
FIG. 2 is a schematic diagram of the information processing equipment according to the first embodiment.
Figure 3:
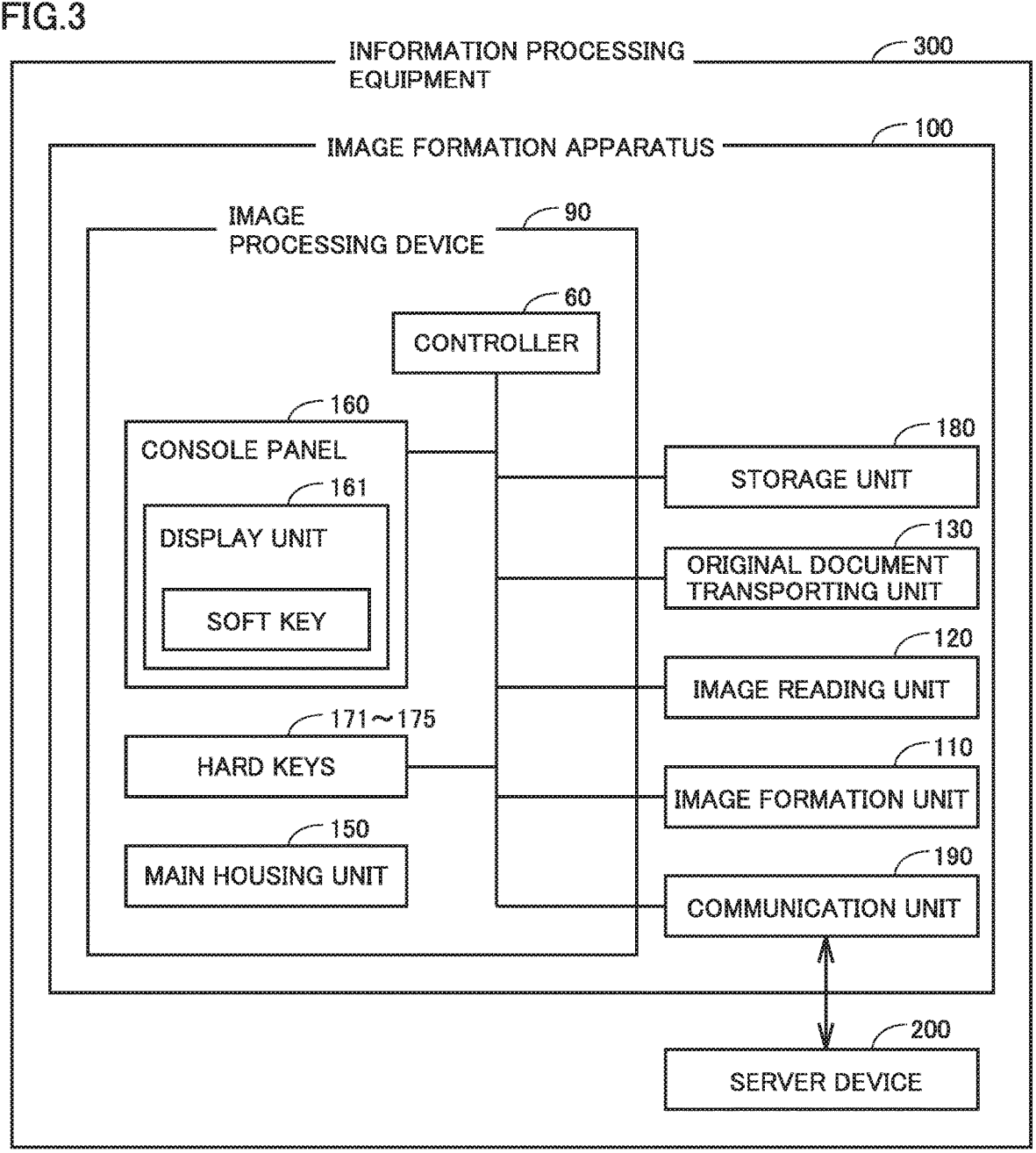
FIG. 3 is a block diagram showing a configuration of the information processing equipment according to the first embodiment.

FIG. 1 is a perspective view showing information processing equipment according to a first embodiment. FIG. 2 is a schematic diagram of the information processing equipment according to the first embodiment. FIG. 3 is a block diagram showing a configuration of the information processing equipment according to the first embodiment. With reference to FIGS. 1 to 3, information processing equipment 300 according to the first embodiment will be described.

As shown in FIGS. 1 to 3, information processing equipment 300 includes an image formation apparatus 100, a server device 200, and a coupling unit 250 (see FIG. 2). Image formation apparatus 100 is arranged above server device 200.

As shown in FIG. 1, image formation apparatus 100 as a whole has a generally rectangular parallelepiped external shape. Image formation apparatus 100 has a front surface 100F, a rear surface 100B, a right side surface 100R, a left side surface 100L, an upper surface 100U, and a lower surface 100D (see FIG. 2).

Image formation apparatus 100 includes an image formation unit 110, recording medium stacking units 111 and 112, an image reading unit 120, an original document transporting unit 130, a cover member 140, a main body housing unit 150, a console panel 160, and a plurality of hard keys 171-175 (see FIG. 3).

Main body housing unit 150 houses image formation unit 110, image reading unit 120, and original document transporting unit 130. Main body housing unit 150 includes a first housing unit 151, a second housing unit 152, and a third housing unit 153.

First housing unit 151 houses image formation unit 110 and recording medium stacking units 111 and 112 therein. Second housing unit 152 houses image reading unit 120 therein. Third housing unit 153 houses original document transporting unit 130 therein.

Main body housing unit 150 has an intermediate portion, as seen in the upward and downward direction, having a peripheral surface partially recessed in the horizontal direction to configure a recessed portion 44. Specifically, recessed portion 44 is formed by having recessed a portion of the right side surface portion of main body housing unit 150 and a portion of the front surface of main body housing unit 150 from the front and right corner of main body housing unit 150. A recording medium on which an image formed by image formation unit 110 is printed is discharged to recessed portion 44. Recessed portion 44 corresponds to a sheet discharging unit.

Original document transporting unit 130 is disposed above image reading unit 120. Original document transporting unit 130 is disposed at an upper right side portion of image formation apparatus 100. Original document transporting unit 130 receives an original document fed to a feed tray 131 and transports the original document via a document reading position of image reading unit 120 to a discharge tray 132.

Feed tray 131 and discharge tray 132 project from third housing unit 153 toward a left side of image formation apparatus 100. Feed tray 131 and discharge tray 132 are provided such that one overlaps the other in the upward and downward direction.

Cover member 140 covers feed tray 131 and discharge tray 132 switchably, between a covering state covering feed tray 131 and discharge tray 132 and an exposing state exposing feed tray 131 and discharge tray 132. Cover member 140 is configured to be pivotable about mi axis corresponding to a direction parallel to the rightward and leftward direction.

Image reading unit 120 is disposed above image formation unit 110. Image reading unit 120 reads image information of an original document placed on a platen.

Image formation unit 110 forms an image based on a control signal received from a controller 60 described later. Further, image formation unit 110 forms an image of an original document read by image reading unit 120.

Image formation unit 110 includes image forming units 1Y, 1M, 1C and 1K, an intermediate transfer belt 30, a primarily transfer roller 31, a secondary transfer roller 33, a driven roller 38, a driving roller 39, a timing roller 40, a fixing device 50, and a controller 60.

Image forming units 1Y, 1M, 1C, and 1K are arranged in order along intermediate transfer belt 30. Image forming unit 1Y receives toner supplied from a toner bottle 15Y to form a toner image of yellow (Y). Image forming unit 1M receives toner supplied from a toner bottle 15M to form a toner image of magenta (M). Image forming unit 1C receives toner supplied from a toner bottle 15C to form a toner image of cyan (C) Image forming unit 1K receives toner supplied from a toner bottle 15K to form a toner image of black (K).

Image forming units 1Y, 1M, 1C, and 1K each include a photoreceptor 10, a charging device 11, an exposure device 12, a developing device 13, and a cleaning device 17.

Charging device 11 charges a surface of photoreceptor 10 uniformly. Exposure device 12 operates in response to a control signal received from controller 60 to irradiate photoreceptor 10 with laser light to expose a surface of photoreceptor 10 to light according to an input image pattern. Thus, an electrostatic latent image depending on an input image is formed on photoreceptor 10.

Developing device 13, while rotating a developing roller 14, applies a developing bias to developing roller 14 and thus causes toner to adhere to a surface of developing roller 14. Thus, the toner is transferred from developing roller 14 to photoreceptor 10, and a toner image depending on an electrostatic latent image is developed on a surface of photoreceptor 10.

Photoreceptor 10 and intermediate transfer belt 30 are in contact with each other at a portion at which primarily transfer roller 31 is provided. Primarily transfer roller 31 is provided in the form of a roller and configured to be rotatable. A transferring voltage opposite in polarity to the toner image is applied to primarily transfer roller 31 to transfer the toner image from photoreceptor 10 to intermediate transfer belt 30.

A toner image of yellow (Y), a toner image of magenta (M), a toner image of cyan (C), and a toner image of black (K) are superposed on one another in order and thus transferred from photoreceptor 10 to intermediate transfer belt 30. Thus, a color toner image is formed on intermediate transfer belt 30.

Intermediate transfer belt 30 is tensioned and thus engaged on driven roller 38 and driving roller 39. Driving roller 39 is rotatably driven for example by a motor (not shown). Intermediate transfer belt 30 and driven roller 38 are ganged with driving roller 39 and thus rotated. Thus, the toner image on intermediate transfer belt 30 is transported by secondary transfer roller 33.

Cleaning device 17 is pressed into contact with photoreceptor 10. Cleaning device 17 collects toner which remains on a surface of photoreceptor 10 after a toner image is transferred.

A recording medium such as a sheet is set in recording medium stacking units 111 and 112. Recording medium S is sent, one at a time, from recording medium stacking unit 111 or 112 by a timing roller along a transport path 41 to secondary transfer roller 33.

Secondary transfer roller 33 is provided in the form of a roller and configured to be rotatable. Secondary transfer roller 33 applies a transferring voltage opposite in polarity to the toner image to a recording medium being transported. Thus, the toner image is attracted from intermediate transfer belt 30 to secondary transfer roller 33, and the toner image on intermediate transfer belt 30 is transferred.

Timing to transport recording medium S to secondary transfer roller 33 is adjusted by a timing roller in accordance with the position of the toner image on intermediate transfer belt 30. By the timing roller, the toner image on intermediate transfer belt 30 is transferred to an appropriate position on recording medium S.

Fixing device 50 applies pressure and heat to recording medium S passing therethrough. Thus, the toner image is fixed to recording medium S. Subsequently, recording medium S is discharged to a tray 48.

Console panel 160 is provided to main body housing unit 150. Specifically, console panel 160 includes a front surface 160a that is an external surface visually observable on main body housing unit 150 and a back surface 160b that is located on a side opposite to the front surface and cannot be visually observed. Console panel 160 is pivotably assembled to main body housing unit 150 so that a closed state in which back surface 160b covers a portion of main body housing unit 150 and an open state in which back surface 160b exposes the portion of main body housing unit 150 are switchable. In the closed state, back surface 160b may or may not be in contact with main body housing unit 150.

Front surface 160a of console panel 160 in the closed state forms a portion of a peripheral surface of image formation apparatus 100. Specifically, front surface 160a of console panel 160 forms a portion of front surface 100F of image formation apparatus 100 in the closed state. Front surface 160a of console panel 160 is generally parallel to the upward and downward direction in the closed state.

Console panel 160 in the closed state is configured to be pivotable about an axis parallel to a horizontal direction orthogonal to a direction normal to front surface 160a. Specifically, console panel 160 in the closed state is configured to be pivotable about an axis parallel to the rightward and leftward direction. When console panel 160 pivots from the closed state to a spaced state, console panel 160 has a lower end side pivoting to move away from main body housing unit 150.

Console panel 160 includes a display unit 161 having a touch panel integrated therewith and an accommodation ease 162 having a window portion 162a. Accommodation case 162 accommodates display unit 161 therein. Display unit 161 is electrically connected by wiring (not shown) to controller 60 disposed in main body housing unit 150. Thus, when console panel 160 is pivotably configured, a degree of freedom of a pivoting operation can be improved.

Display unit 161 displays a plurality of soft keys. The plurality of soft keys include a switching operation key for switching a plurality of operation modes in a normal image forming state, a numerical value input key for inputting a numerical value, and an instruction key for providing an instruction to perform a processing operation of image formation unit 110. By providing such a plurality of soft keys, printing when normally forming an image can be handled. A display surface of display unit 161 displaying the plurality of soft keys can be visually recognized from window portion 162a. That is, display unit 161 can be visually recognized from front surface 160a of console panel 160.

Front surface 160a of console panel 160 includes a console surface 160a1 for operating the plurality of soft keys and an outer peripheral region 160a2 surrounding console surface 160a 1. Console surface 160a1 is a portion corresponding to the display surface visible from window portion 162a. Outer peripheral region 160a2 is configured by a front surface of accommodation case 162.

No hard key is provided on front surface 160a of console panel 160. That is, no hard key is provided on any of console surface 160a1 or outer peripheral region 160a2 of console panel 160.

The plurality of hard keys 171-175 (see FIG. 7) are provided at a position distant from front surface 160a. The plurality of hard keys 171-175 are provided at main body housing unit 150. Specifically where the plurality of hard keys 171-175 are disposed will be described later with reference to FIGS. 4 and 5.

Hard key 171 is a sub power supply switch. Hard key 172 is a stop key for stopping a processing operation of image formation unit 110. Hard key 173 is a return key for returning a control of image formation unit 110. Hard key 174 is a reset key for ring an image forming condition of image formation unit 110. Hard key 175 is a power supply switch. Providing the plurality of hard keys 171-175 in this manner ensures that a switch for wiling on power supply and a switch for performing maintenance are separated from a soft key used for normally forming an image.

Hard keys 171-174 correspond to a maintenance switch used for maintenance of image formation unit 110. The maintenance switch configured to include at least any one of hard keys 171-174 facilitates maintenance operation.

Server device 200 is connected to image formation apparatus 100 via a signal line (not shown) or the like, and communicates a sensor value of each device, data used for its operation, and the like, as required. Image formation apparatus 100 and server device 200 have different power supplies, respectively, and can operate independently from each other, and server device 200 has a basic feature such as constantly operating for receiving access from a client device via a network.

Server device 200 alone functions as a mail server, a Web server, an application server, a file server, a print server, and the like, and can perform processing based on a predetermined computer program (e.g., storage of data organization of data, various types of dynamic processing, various types of responsive processing, and the like) in response to a request received from a client device or the like.

Server device 200 as a whole also has a generally rectangular parallelepiped external shape. Server device 200 has a front surface 200F, a rear surface 200B, a right side surface 200R, a left side surface 200L, an upper surface 200U ((see FIG. 2), and a lower surface 200D.

Server device 200 includes a housing 200C and a server main body unit 230 as it is constituent components. Server main body unit 230 is composed of a mother board, a CPU, a recording device (a HDD, a SSD, etc.), a network interface (IF), a heat sink, a power supply, and the like.

Coupling unit 250 couples a portion of lower surface 200D of image formation apparatus 100 and a portion of upper surface 200U of server device 200. Thus, image formation apparatus 100 and server device 200 are integrated together.

As shown in FIG. 3, image formation apparatus 100 father includes a storage unit 180 and a communication unit 190. A program for executing various processes is stored in storage unit 180 in advance. For example, communication unit 190 communicates with a user terminal, server device 200, and the like Further, image formation apparatus 100 includes an image processing device 90. Image processing device 90 includes the above-described controller 60, main body housing unit 150, console panel 160, and the plurality of hard keys 171-175.

Image processing device 90 performs by controller 60 image processing while referring to a program or the like recorded in storage unit 180. The image processing includes, for example, expanding image data, correcting expanded image data, combining corrected image data, and outputting combined image data.

In performing the image processing, controller 60 expands image data read by image reading unit 120. Subsequently, controller 60 partially corrects the expanded image data. Subsequently, controller 60 combines the corrected image data. Subsequently, controller 60 outputs the combined image data. An image is formed based on the output image data.

Furthermore, data received from a user terminal and server device 200 and the like, as well as image data read by image reading unit 120, is also similarly subjected to image processing by image processing device 90.

Figure 4:
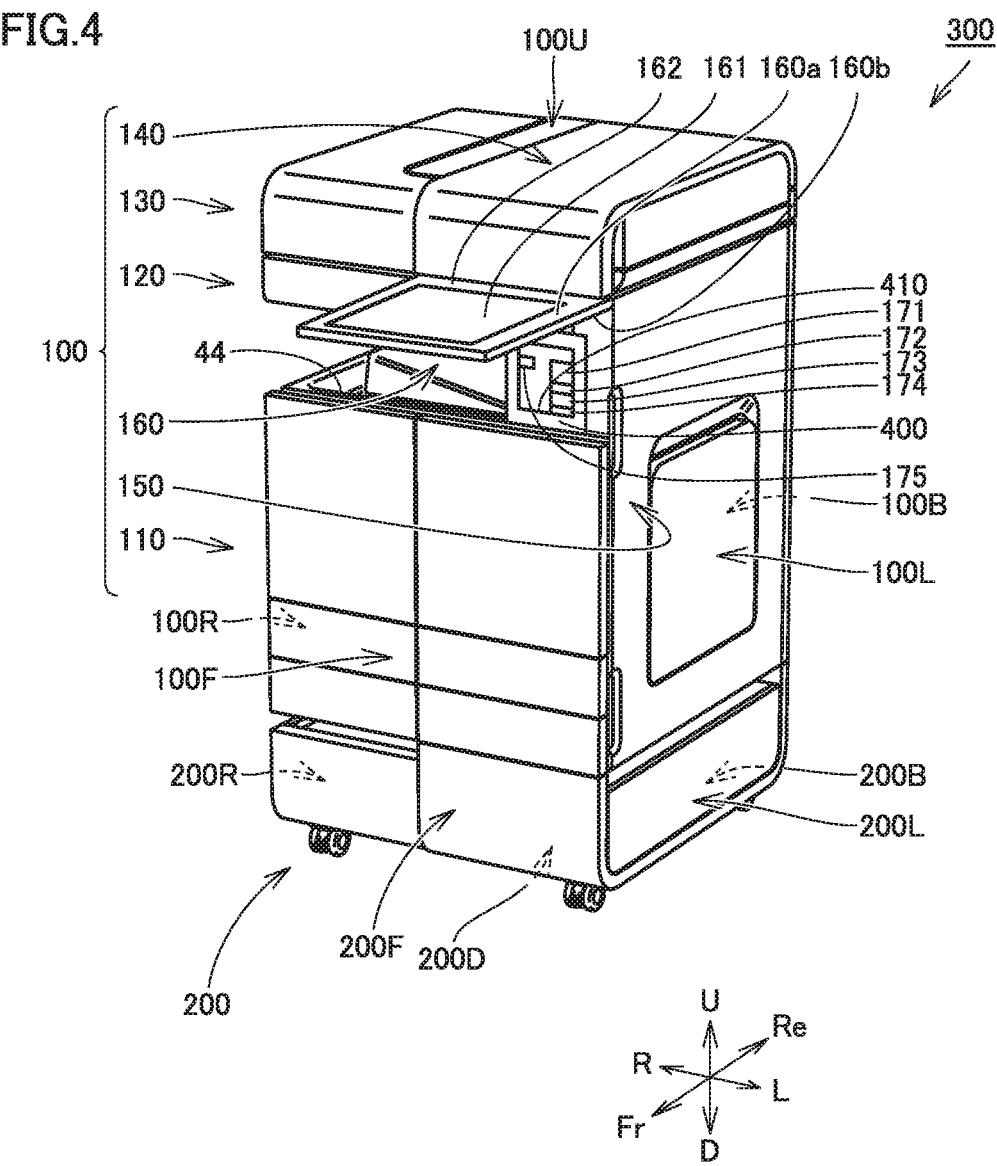
FIG. 4 is a perspective view showing an open state in which a back surface of a console panel of the information processing equipment according to the first embodiment exposes a portion of a main body housing unit.
Figure 5:
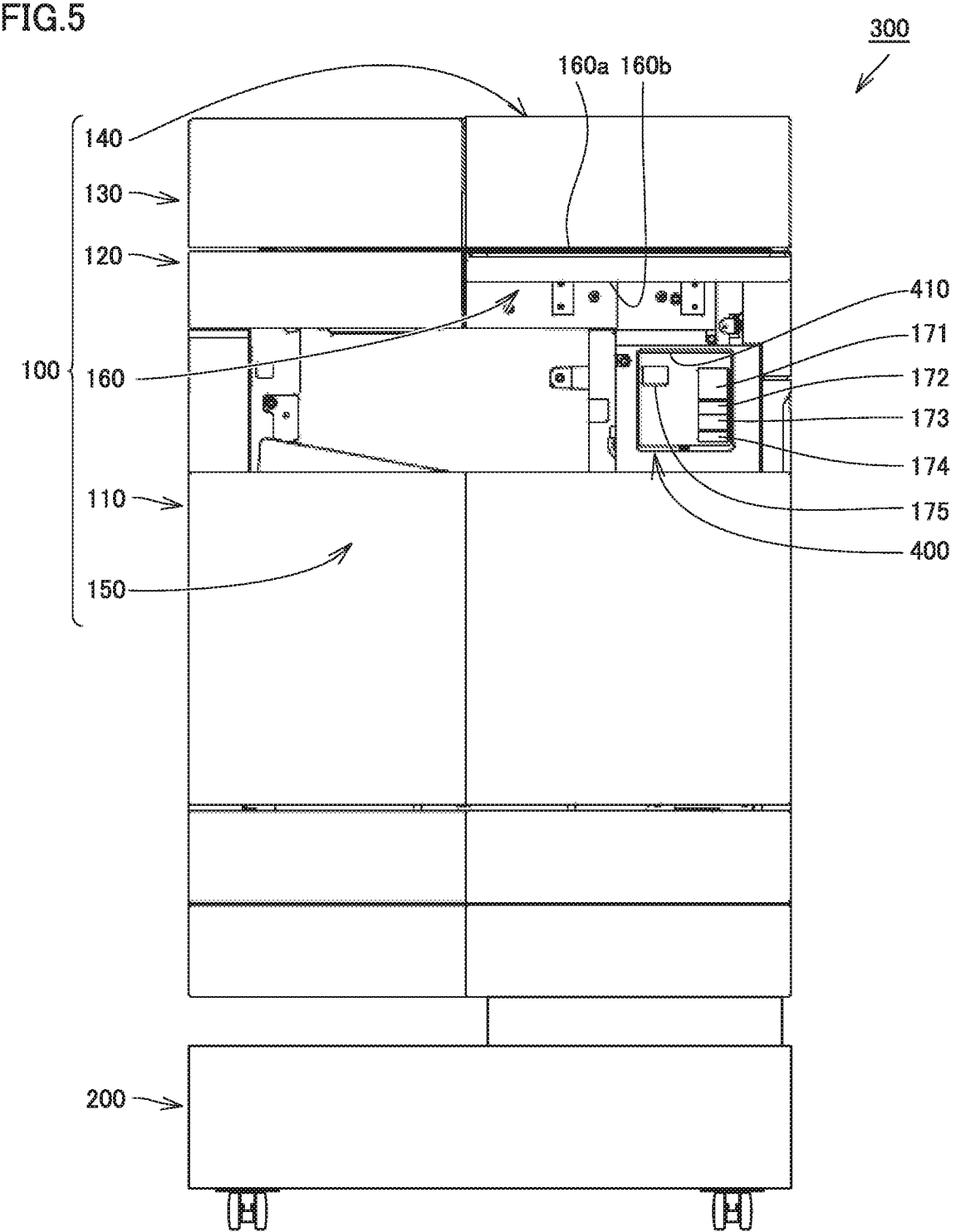
FIG. 5 is a front view showing the open state in which the back surface of the console panel of the information processing equipment according to the first embodiment exposes a portion of the main body housing unit.

FIG. 4 is a perspective view showing an open state in which the back surface of the console panel of the information processing equipment according to the first embodiment exposes a portion of the main body housing unit. FIG. 5 is a front view showing the open state in which the back surface of the console panel of the information processing equipment according to the first embodiment exposes the portion of the main body housing unit. With reference to FIGS. 4 and 5, where the plurality of hard keys 171-175 are provided will be described.

As shown in FIGS. 4 and 5, main body housing unit 150 has a housing unit 400 for housing a plurality of hard keys 171-175. Housing unit 400 is formed by having a portion of main body housing unit 150 receding inward. Housing unit 400 is formed by having a portion of the front surface of main body housing unit 150 receding rearward.

Housing unit 400 has a box shape having an opening 410 that opens forward. Housing unit 400 is located behind console panel 160 in the closed state in which back surface 160b of console panel 160 is in contact with main body housing unit 150.

In the closed state, when viewed from the front side of console panel 160, the hard keys are disposed to be accommodated within a width of console panel 160 which is orthogonal to a thickness direction in which front surface 160a and back surface 160b of console panel 160 are aligned and to the upward and downward direction.

Console panel 160 functions as a lid member that covers opening 410 of housing unit 400 so as to be capable of opening and closing it. In the closed state, opening 410 of housing unit 400 is covered with console panel 160. In this state, the plurality of hard keys 171-175 arc not exposed externally (specifically, outside image formation apparatus 100 or image processing device 90). Thus, in the closed state, the plurality of hard keys 171-175 are externally inaccessible.

On the other hand, in the open state in which back surface 160b of console panel 160 exposes a portion of main body housing unit 150, opening 410 of housing unit 400 is exposed outside (specifically, outside image formation apparatus 100 or image processing device 90). Thus, in the open state, the plurality of hard keys 171-175 are externally accessible.

Figure 6:
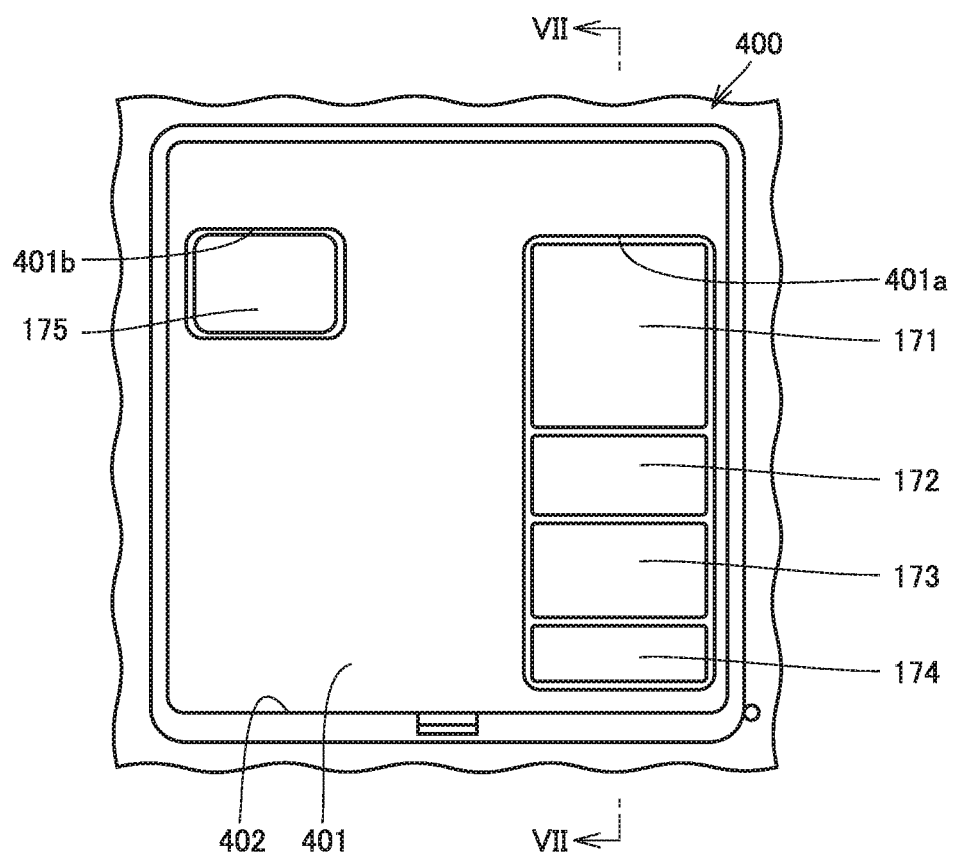
FIG. 6 is a front view showing a configuration of a plurality of hard keys arid their surroundings according to the first embodiment.
Figure 7:
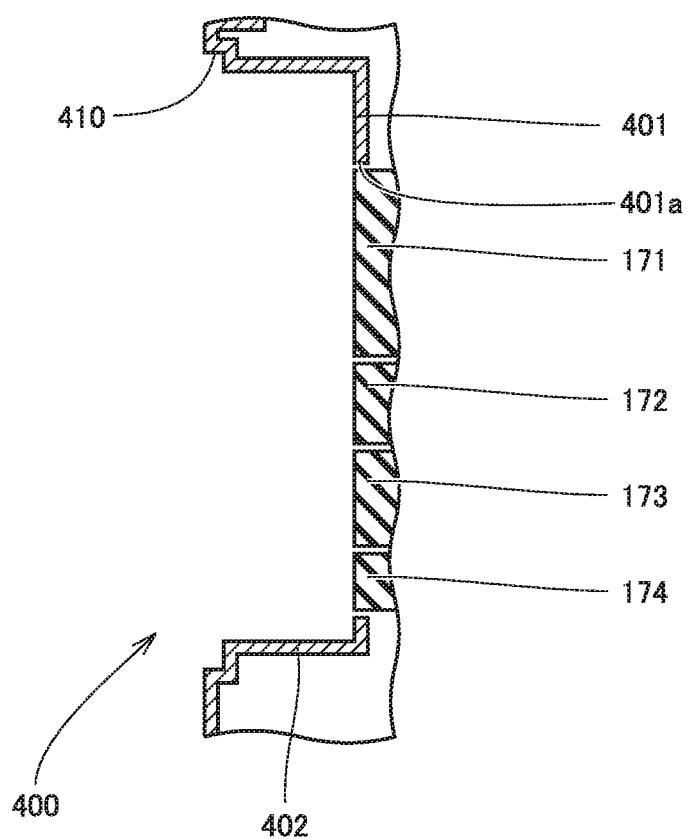
FIG. 7 is a cross section showing the configuration of the plurality of hard keys and their surroundings according to the first embodiment.

FIG. 6 is a front view showing a configuration of the plurality of hard keys and their surroundings according to the first embodiment. FIG. 7 is a cross section showing the configuration of the plurality of hard keys and their surroundings according to the fast embodiment.

As shown in FIGS. 6 and 7, housing unit 400 surrounds the plurality of hard keys 171-175. Housing unit 400 corresponds to an enclosure portion enclosing the plurality of hard keys.

Housing unit 400 has a bottom portion 401 and a peripheral wall portion 402. Bottom portion 401 is in the form of a plate. Bottom portion 401 is parallel to the upward and downward direction. Bottom portion 401 is substantially orthogonal to a direction in which the plurality of hard keys 175 are pressed.

Bottom portion 401 is provided with a hole 401a for exposing hard keys 171-174 and a hole 401b for exposing hard key 175. A main surface of bottom portion 401 facing an outside of main body housing, unit 150 is flush with a surface of each of the plurality of hard keys 171-175 that is pressed.

Peripheral wall portion 402 erects from a peripheral portion of bottom portion 401. Specifically, peripheral wall portion 402 erects front the peripheral portion of bottom portion 401 toward outside main body housing unit 150. More specifically, peripheral wall portion 402 erects forward from the peripheral portion of bottom portion 401.

Housing unit 400 preferably has a color identical to a color of the plurality of hard keys 171-175. More specifically, bottom portion 401 preferably has a color identical to a color of the plurality of hard keys 171-175. This allows the plurality of hard keys 171-175 to be visually integrated with a surrounding member and thus less noticeable.

When an operator performs maintenance, the operator causes console panel 160 to pivot from the closed state to the open state. In the open state, by pressing a portion of the plurality of hard keys that are now externally accessible, the operator switches an operation mode of image formation apparatus 100 to a maintenance mode.

In the maintenance mode, the operator follows an operation procedure to perform maintenance. For example, the operator replaces various replacement parts such as photoreceptor 10 and a sheet feeding roller. In doing so, the operator presses various hard keys. For example, the operator presses hard key 171 (or the sub power supply switch) so that no voltage is applied to a member of high potential, hard key 174 to reset a counter which counts how many times the equipment is used, or the like.

In contrast, when a user performs normal image formation, the user operates a soft key displayed on display unit 161 of console panel 160. No hard key is provided on front surface 160a of console panel 160, and the plurality of hard keys 171-175 are provided at a position distant from front surface 160a of console panel 160, as has been described above.

This allows the user to be less aware of the hard keys at the time of normal image formation. This prevents the user from operating a hard key for switching to the maintenance mode, and as a result, can prevent an erroneous operation such as erroneously switching to the maintenance mode at the time of normal image formation.

In addition, no hard key is provided on front surface 160*a* of console panel 160, and a novel impression can be given to the user. Designability can thus be enhanced.

Thus, according to the first embodiment, image processing device 90, image formation apparatus 100, and information processing equipment 300 can suppress an erroneous operation of a user and also enhance designability.

Furthermore, by housing the plurality of hard, keys in housing unit 400 provided to main body housing unit 150, and covering opening 410 of housing unit 400 with console panel 160 such that opening 410 can be exposed and closed by console panel 160, as has been described above, in the closed state the plurality of hard keys 171-175 are covered with console panel 160 and thus not exposed outside image formation apparatus 100. In other words, In the closed state, the plurality of hard keys are invisible to the user. This allows the user to be further less aware of the hard keys at the time of normal image formation. This can further suppress an erroneous operation of the user and also further enhance designability.

Note that while in the first embodiment a case has been described by way of example in which housing unit 400 is provided behind console panel 160 in the closed state and opening 410 of housing unit 400 is covered with console panel 160 such that opening 410 can be exposed and closed by console panel 160, this is not exclusive. Housing unit 400 may be provided at another portion of main body housing unit 150 such as a right side surface, a left side surface, a rear surface, etc. thereof. In that ease, opening 410 of housing unit 400 is not covered with console panel 160 and instead covered with a lid member such that opening 410 can be exposed and closed by that lid member.

In addition, console panel 160 is assembled to main body housing writ 150 so as to pivot to be capable of switching the closed state and the open state, and the plurality of hard keys are externally inaccessible in the closed state and externally accessible in the open state. Thus the plurality of hard keys can be provided at a position relatively close to console panel 160 while the plurality of hard keys are not easily visually recognizable by the user. When a maintenance operator performs a maintenance operation, the operator may use one hand to operate a hard key to switch the current mode to the maintenance mode and may also use the other hand to operate a soft key of console panel 160 to perform an operation such as setting of maintenance. Providing the plurality of hard keys at a position relatively close to console panel 160 While the plurality of hard keys are not easily visually recognizable by the user can reduce a burden on the maintenance operator and enhance working efficiency of maintenance.

Furthermore, console panel 160 covering the plurality of hard keys 171-175 in the closed state can eliminate the necessity of preparing an additional member for covering the plurality of hard keys and thus allows the equipment to be simplified in configuration.

Further, when the console panel pivots from the closed state to the open state, the lower end side of console panel 160 pivots to move away from main body housing unit 150. When a user operates console panel 160, it is often the case that the position of the face of the user is higher in level than console panel 160. When console panel 160 pivots as described above, a state can be maintained in which the plurality of hard keys are still hidden by console panel 160.

Furthermore, housing unit 400 surrounding the plurality of hard keys 171-175 that has a color identical to a color of the plurality of hard keys 171-175 allows the plurality of hard keys 171-175 to be visually integrated with a surrounding member and thus less noticeable. This can further suppress an operation erroneously done by a user, i.e., erroneously operating the plurality of hard keys.

Furthermore, a main surface of bottom portion 401 facing an outside of main body housing unit 150 that is flush with a surface of each of the plurality of hard keys 171-175 that is pressed, allows the plurality of hard keys 171-175 to be less noticeable. This can also further suppress an operation erroneously done by a user, i.e., erroneously operating the plurality of hard keys.

(Exemplary Variation)

Figure 8:
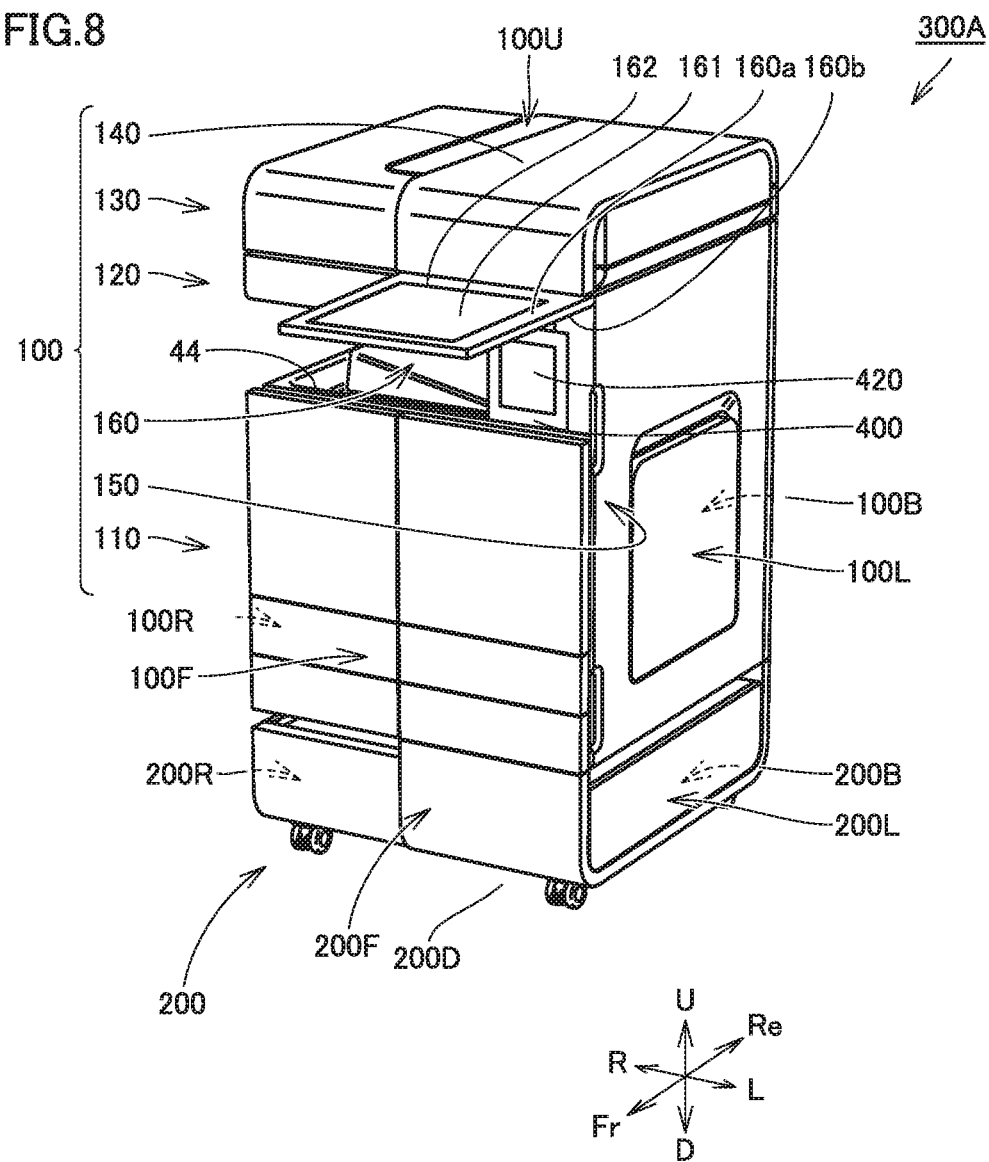
FIG. 8 is a perspective view showing an open state in which a back surface of a console panel of information processing equipment according to an exemplary variation exposes a portion of a main body housing unit.
Figure 9:
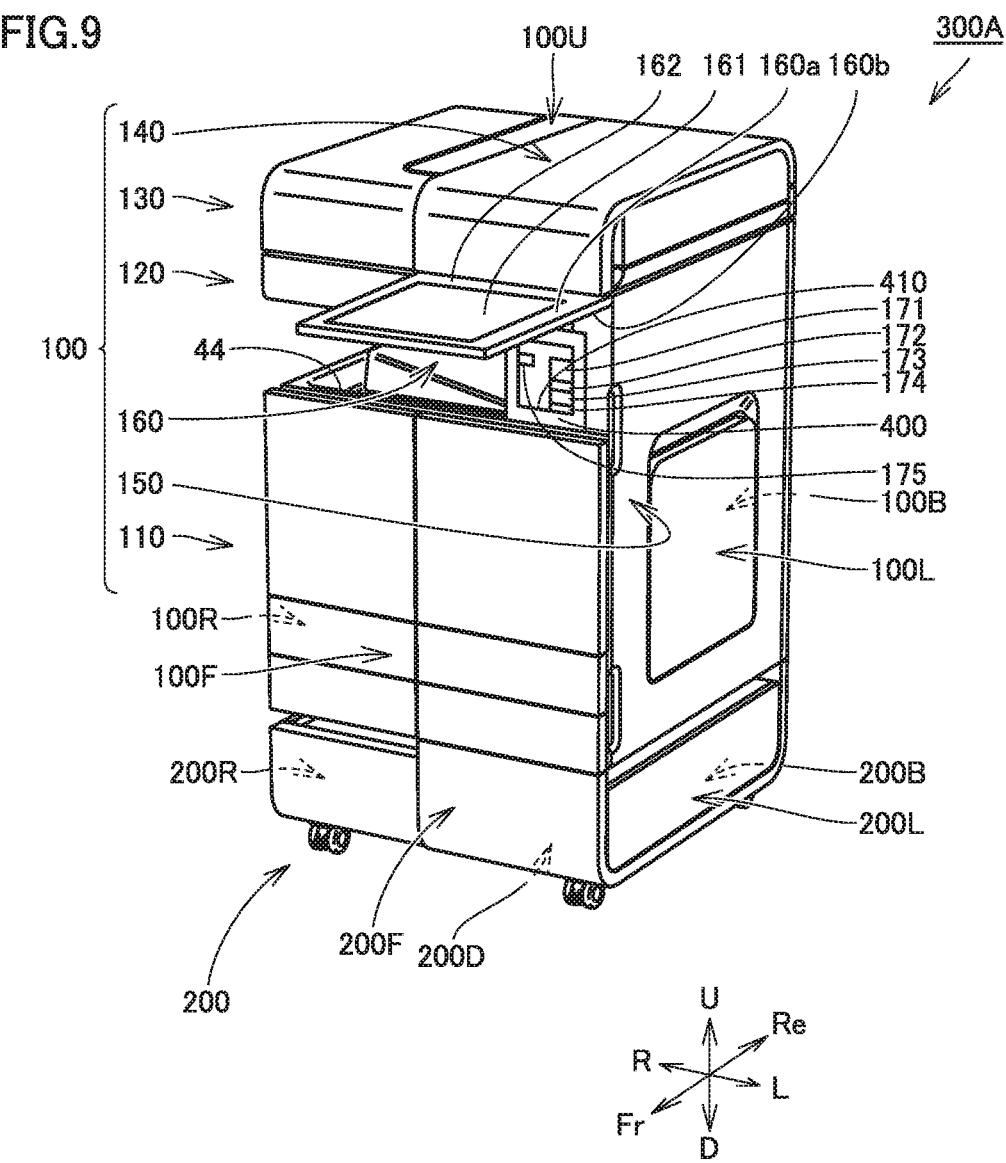
FIG. 9 is a perspective view showing an open state in which a back surface of a console panel of information processing equipment according to an exemplary variation exposes a portion of a main body housing unit.

FIG. 8 is a perspective view showing an open state in which a back surface of a console panel of information processing equipment according to an exemplary variation exposes a portion of a main body housing unit. FIG. 9 is a perspective view showing an open state in which a back surface of a console panel of information processing equipment according to an exemplary variation exposes a portion of a main body housing unit.

As shown in FIGS. 8 and 9, information processing equipment 300A according to the exemplary variation is different from information processing equipment 300 according to the first embodiment in that a closing portion 420 is provided to close opening 410 of housing unit 400 such that the former can expose and close the latter. The remainder in configuration is substantially the same.

Housing unit 400 corresponds to an enclosure portion enclosing the plurality of hard keys, and, as well as in the first embodiment, includes a bottom portion (a plate-shaped portion) transverse to a direction in which the plurality of hard keys 171-175 are pressed, and surrounding the plurality of hard keys 171-175, a surrounding peripheral wall portion erecting from a peripheral portion of the bottom portion, and closing portion 420 closing an opening on the side of a tip end of the peripheral wall portion such that closing portion 420 can expose and close the opening.

Closing portion 420 is located behind console panel 160 in the closed state in which back surface 160*b* of console panel 160 is in contact with main body housing unit 150. In the closed state, closing portion 420 may be in contact with back surface 160*b* of console panel 160.

In that case, the plurality of hard keys 171-175 can be accessed by setting console panel 160 in the open state and removing closing portion 420.

In information processing equipment 300 according to the exemplary variation, opening, 410 of housing unit 400 is closed by closing portion 420, and when console panel 160 is caused to pivot, the plurality of hard keys 171-175 are less easily discovered by the user. Thus the exemplary variation more reliably prevents an erroneous operation of a user than the first embodiment.

Note that housing unit 400 is positionally not limited to a front side of main body housing unit 150 and may be provided at another portion of main body housing unit 150 such as a right side surface, a left side surface, a rear surface, etc. thereof. In that case, closing portion 420 is preferably a portion of an external shell of image formation apparatus 100.

(Second Embodiment)

Figure 10:
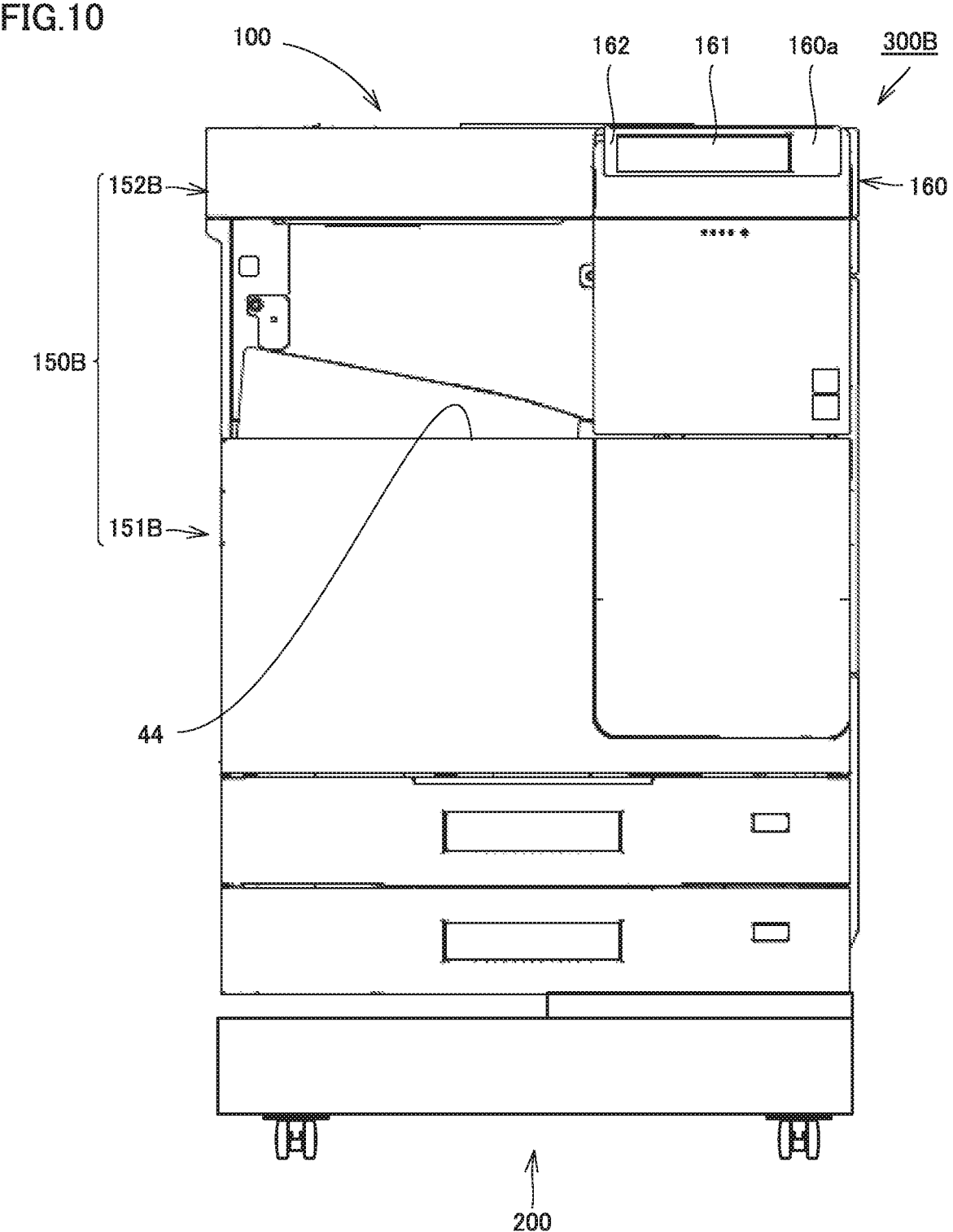
FIG. 10 is a front view of information processing equipment according to a second embodiment.
Figure 11:
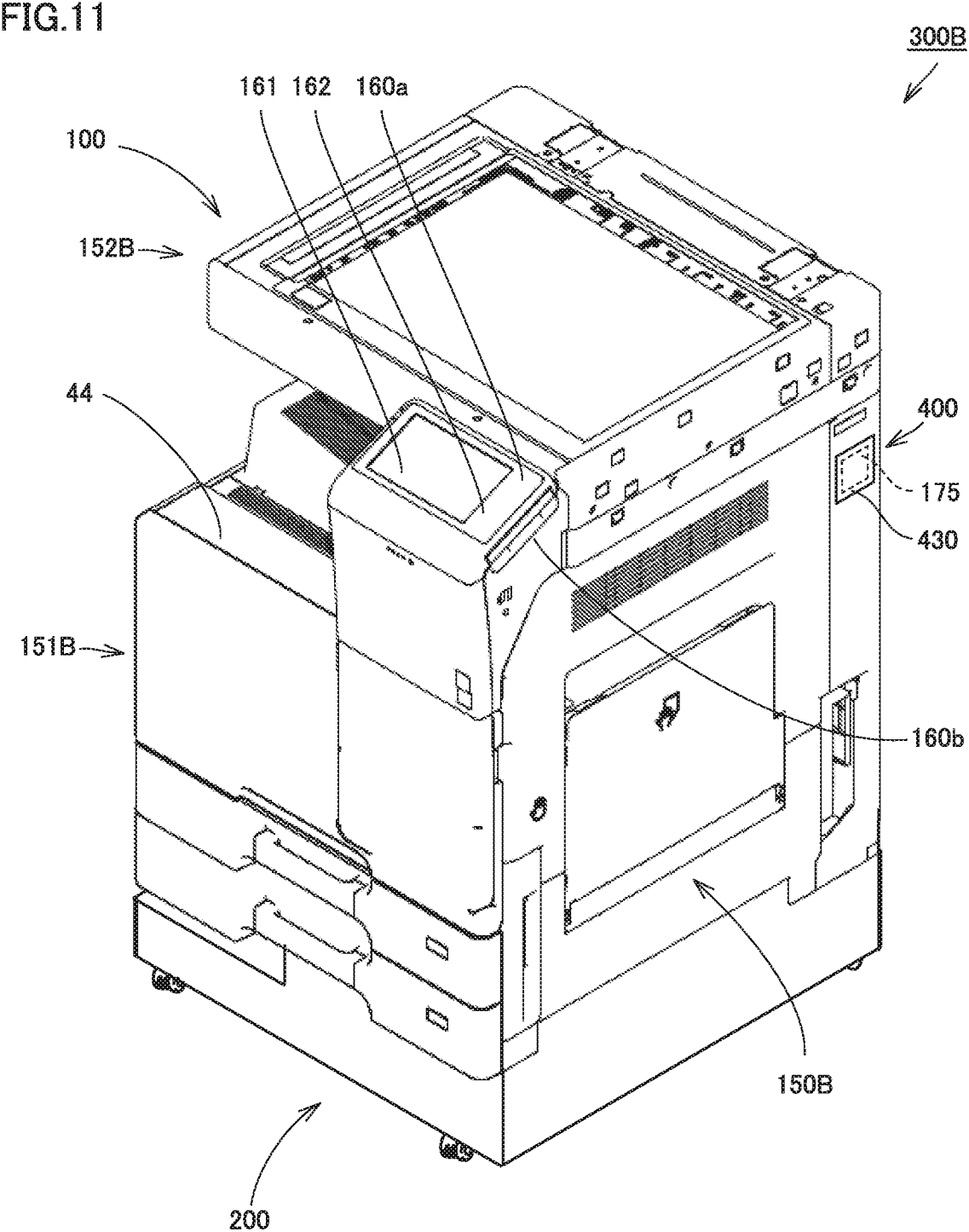
FIG. 11 is a perspective view of the information processing equipment according to the second embodiment.

FIG. 10 is a front view of information processing equipment according to a second embodiment. FIG. 11 is a perspective view of the information processing equipment according to the second embodiment. FIG. 12 is a perspective view showing a back surface side of an image reading unit in the information processing equipment according to the second embodiment. In FIGS. 10 to 12, the original document transporting unit and the cover member are not shown.

As shown in FIGS. 10 to 12, information processing equipment 300B according to the second embodiment is different from information processing equipment 300 according to the first embodiment mainly by the shape of a main body housing unit 150B, the location of console panel 160, and the location of the plurality of hard keys 171-175. The remainder in configuration is substantially the same.

Main body housing unit 150B includes a first housing unit 151B that houses the image formation unit, a second housing unit 152B that houses the image reading unit, and a third housing unit (not shown) that houses the original document transporting unit. When viewed from above, first housing unit 151B projects frontward as compared with second housing unit 152B.

First housing unit 151B includes a portion located frontward as compared with the image reading unit, and console panel 160 is assembled to that portion. Console panel 160 is provided so as to face upward. Console panel 160 is configured to have at a lower end side thereof an axis parallel to the rightward and leftward direction and pivot about that axis. When console panel 160 pivots from a closed state in which back surface 160b is in contact with main body housing unit 150B to an open state in which back surface 160b is spaced from main body housing unit 150B, an upper end side of console panel 160 is spaced from main body housing unit 150B.

The plurality of hard keys 171-174 are, provided to the main body housing unit at a portion that defines an upper portion of recessed portion 44. Specifically, the plurality of hard keys 171-174 are provided at a portion of second housing unit 152B housing the image reading unit, that faces first housing unit 151B with a space interposed between second housing unit 152B and first housing unit 151B. In other words, the plurality of hard keys 171-174 are provided on a back surface 152b of second housing unit 152B.

When a user operates console panel 160, it is often the case that the position of the face of the user is higher in level than console panel 160. The plurality of hard keys 171-174 provided as described above can be less noticeable.

The back surface of second housing unit 152B corresponds to an enclosure portion surrounding the plurality of hard keys 171-174. By making second housing unit 152B the same in color as the plurality of hard keys 171-174, the plurality of hard keys 171-174 can further be less noticeable.

Back surface 152b of second housing unit 152B is generally orthogonal to a direction in which the plurality of hard keys 171-174 are pressed. Back surface 152b of second housing unit 152B is flush with a surface of the plurality of hard keys 171-174 that is pressed. This allows the plurality of hard keys 171-174 to be further less noticeable.

Thus, the plurality of hard keys 171-174 thus less easily visually recognizable by a user, can suppress an operation erroneously done by the user, i.e., erroneously operating the plurality of hard keys 171-174 in normally forming an image. An operation erroneously done by the user can thus be suppressed.

Hard key 175 is housed in housing unit 400 provided at main body housing unit 150. Housing unit 400 is provided at a left side surface of main body housing unit 150. Housing unit 400 has opening 410 that opens outward. Opening 410 is covered with a lid member 430 composing a portion of an external shell of main body housing unit 150. Hard key 175 thus housed in housing unit 400 closed by lid member 430 such that housing unit 400 can be opened and closed by lid member 130 is not visually recognized by the user. This can suppress an operation erroneously done by a user. i.e., erroneously pressing hard key 175 dining normal image formation. An operation erroneously done by the user can thus be suppressed.

In addition, no hard key is provided on front surface 160a of console panel 160, and a novel impression can be given to the user. Designability can thus be enhanced.

Image processing device 90, image formation apparatus 100 and information processing equipment 300B thus configured according to the second embodiment also provide substantially the same effect as in the first embodiment.

While in the first and second embodiments and exemplary variation described above a case has been described by way of example in which a plurality of hard keys are provided, this is not exclusive and a single hard key may be provided. Furthermore, the plurality of hard keys are not limited to five hard keys, and may be two to four hard keys or may be six or more hard keys. Furthermore, the hard key is not limited to a button which can be pressed, and may include a dial in the form of a knob.

While in the first and second embodiments and exemplary variation described above a case has been described by way of example in which the plurality of hard keys 171-175 are housed in housing unit 400 of main body housing unit 150, this is not exclusive. In so far as the plurality of hard keys 171-175 are not provided on front surface 160a of console panel 160, the plurality of hard keys 171-175 may be provided on back surface 160b of console panel 160 or may be provided on a peripheral surface of console panel 160. This case also allows the plurality of hard keys 171-175 to be distant from front surface 160a. This can suppress an operation erroneously done by a user, i.e., erroneously pressing the plurality of hard keys 171-175 during normal image formation when performing an operation on the console surface of console panel 160. An operation erroneously done by the user can thus be suppressed.

Further, when the plurality of hard keys 171-175 are provided at main body housing unit 150, the plurality of hard keys 171-175 can be further distant from front surface 160a of console panel 160. This can further suppress an operation erroneously done by a user, i.e., erroneously pressing the plurality of hard keys 171-175 during normal image formation when performing an operation on the console surface of console panel 160.

In addition, whether the plurality of hard keys 171-175 may be provided at a peripheral surface of console panel 160, a back surface of console panel 160 or main body housing unit 150, no hard key is provided on front surface 160a of console panel 160, and a novel impression can be given to tile user. Designability can thus be enhanced.

Information processing equipment based on the present disclosure described above comprises a main body housing unit; and a console panel provided at the main body housing unit, the console panel having a front surface which has a display unit visible on the main body housing unit and does not include at least a hard key for switching an operation mode to a maintenance mode, the hard key being provided on a surface other than the front surface of the console panel.

In the information processing equipment according to the present disclosure, preferably the display unit has a touch panel, and displays a soft key and is thus operable.

In the information processing equipment according to the present disclosure, the main body housing unit may include a housing unit which houses the hard key and has an opening which opens outward, and a lid member covering the opening of the housing unit such that the opening can be exposed and closed by the lid member. In that case, preferably the hard key is not exposed outside in a state in which the opening of the housing unit is covered with the lid member.

In the information processing equipment according to the present disclosure, the main body housing unit may include a recessed portion configured by having a peripheral surface of the main body housing unit partially recessed in a horizontal direction. In that case, the hard key may be provided to the main body housing unit at a portion that defines an upper portion of the recessed portion.

In the information processing equipment according to the present disclosure, the console panel includes a back surface opposite to the front surface, and may be pivotably assembled to the maim body housing unit such that a closed state in which a portion of the main body housing unit is covered and an open state in which the portion of the main body housing unit is exposed are switchable. In that case, preferably the hard key is disposed at a position externally inaccessible when the back surface is in the closed state.

In the information processing equipment according to the present disclosure, preferably the console panel covers the hard key in the closed state.

In the information processing equipment according to the present disclosure, preferably the console panel in the closed state has the front surface and the back surface in parallel in an upward and downward direction, and when the console panel pivots from the closed state to the open state, a lower end side of the console panel pivots to move away from the main body housing unit.

In the information processing equipment according to the present disclosure, preferably, the hard key is disposed such that, in the closed state, when viewed from a front side of the console panel, the hard key is accommodated within a width of the console panel which is orthogonal to a thickness direction in which the front surface and the back surface are aligned and to an upward and downward direction.

In the information processing equipment according to the present disclosure, preferably the main body housing unit includes an enclosure portion enclosing the hard key. In that case, preferably the hard key has a color identical to a color of the enclosure portion.

In the information processing equipment according to the present disclosure, preferably the main body housing unit includes an enclosure portion enclosing the hard key. Furthermore, preferably the hard key has a surface to be pressed, in that case, preferably the enclosure portion has a plate-shaped portion transverse to a direction in which the hard key is pressed, and surrounding the hard key, and preferably a main surface of the plate-shaped portion facing an outside of the main body housing unit is flush with the surface to be pressed.

In the information processing equipment according to the present disclosure, preferably the main body housing unit includes an enclosure portion enclosing the hard key. In that case, the enclosure portion may have a plate-shaped portion transverse to a direction in which the hard key is pressed, and surrounding the hard key, a surrounding peripheral wall portion erecting from a peripheral portion of the plate-shaped portion, and a closing portion closing an opening on a side of a tip end of the peripheral wall portion such that the closing portion can expose and close the opening.

Preferably, the information processing equipment according to the present disclosure comprises an image formation apparatus comprising an image formation unit to form an image on a recording medium and a controller to control an operation of the image formation unit. In that case, preferably the image formation unit and the controller are housed in the main body housing unit.

In the information processing equipment according to the present disclosure, preferably the image formation unit has a plurality of operation modes. In that case, preferably the display unit displays a plurality of soft keys, and preferably the plurality of soft keys include a switching operation key operated to switch the plurality of operation modes, a numerical value input key operated to input a numerical value, and an instruction key operated to provide an instruction to perform a processing operation of the image formation unit.

In the information processing equipment according to the present disclosure, preferably the hard key includes any of a sub power supply switch, a stop key operated to stop a processing operation of the image formation unit, a return key operated to return a control of the image formation unit, and a reset key operated to initialize an image forming condition of the image formation unit.

In the information processing equipment according to the present disclosure, preferably the display unit of the console panel is electrically connected by wiring to the controller.

In the information processing equipment according to the present disclosure, a server device connected to a network and performing a predetermined process may be coupled with the image formation apparatus.

Although embodiments of the present invention have been described and illustrated in detail, the disclosed embodiments are made for purposes of illustration and example only and not limitation. The scope of the present invention should be interpreted by terms of the appended claims.

What is claimed is:
1. Information processing equipment comprising:
a main body housing unit; and
a console panel provided at the main body housing unit,
wherein the console panel comprises a front surface which includes a display screen that is visible from a front of the main body housing unit when the console panel is in a closed state and when the console panel is in an open state,
wherein the console panel does not include at least a hard key for switching an operation mode to a maintenance mode,
wherein the hard key is provided on a peripheral surface of the main body housing unit, and
wherein when the console panel is in the closed state, the hard key is hidden by the console panel.

2. The information processing equipment according to claim 1, wherein the display screen comprises a touch panel, and displays a soft key that is operable by a user.

3. The information processing equipment according to claim 1, wherein the main body housing unit comprises:
a housing unit which houses the hard key and has an opening which opens outward, and
a lid member covering the opening of the housing unit such that the opening can be exposed and closed by the lid member, and
wherein the hard key is not exposed outside in a state in which the opening of the housing unit is covered with the lid member.

4. The information processing equipment according to claim 1, wherein the main body housing unit includes a recessed portion configured by having a peripheral surface of the main body housing unit partially recessed in a horizontal direction.

5. The information processing equipment according to claim 1, wherein the console panel further comprises a back surface opposite to the front surface,
wherein the console panel is pivotably assembled to the main body housing unit so as to be switchable between the closed state, in which a portion of the main body housing unit is covered, and the open state, in which the portion of the main body housing unit is exposed, and
wherein the hard key is disposed at a position externally inaccessible when the console panel is in the closed state.

6. The information processing equipment according to claim 5, wherein in the closed state, the front surface and the back surface of the console panel are parallel in an upward and downward direction, and when the console panel pivots from the closed state to the open state, a lower end side of the console panel pivots to move away from the main body housing unit.

7. The information processing equipment according to claim 5, wherein the hard key is disposed such that, in the closed state, when viewed from a front side of the console panel, the hard key is accommodated within a width of the console panel which is orthogonal to a thickness direction in which the front surface and the back surface are aligned and to an upward and downward direction.

8. The information processing equipment according to claim 1, wherein the main body housing unit includes an enclosure portion enclosing the hard key, and
wherein the hard key has a color identical to a color of the enclosure portion.

9. The information processing equipment according to claim 1, wherein:
the main body housing unit includes an enclosure portion enclosing the hard key,
the hard key has a surface to be pressed,
the enclosure portion has a plate-shaped portion that is transverse to a direction in which the hard key is pressed and that surrounds the hard key, and
a main surface of the plate-shaped portion facing an outside of the main body housing unit is flush with the surface to be pressed.

10. The information processing equipment according to claim 1, wherein the main body housing unit includes an enclosure portion enclosing the hard key, and
wherein the enclosure portion comprises:
a plate-shaped portion that is transverse to a direction in which the hard key is pressed and that surrounds the hard key;
a surrounding peripheral wall portion protruding from a peripheral portion of the plate-shaped portion; and
a closing portion closing an opening on a side of a tip end of the peripheral wall portion such that the closing portion can expose and close the opening.

11. The information processing equipment according to claim 1, wherein the information processing equipment comprises an image formation apparatus including an image formation unit to form an image on a recording medium and a controller to control an operation of the image formation unit.

12. The information processing equipment according to claim 11, wherein:
the image formation unit has a plurality of operation modes,
the display screen displays a plurality of soft keys, and
the plurality of soft keys include a switching operation key operable to switch the plurality of operation modes, a numerical value input key operable to input a numerical value, and an instruction key operable to provide an instruction to perform a processing operation of the image formation unit.

13. The information processing equipment according to claim 12, wherein the hard key comprises one of a sub power supply switch, a stop key operated to stop a processing operation of the image formation unit, a return key operated to return a control of the image formation unit, and a reset key operated to initialize an image forming condition of the image formation unit.

14. The information processing equipment according to claim 11, wherein the display screen of the console panel is electrically connected by wiring to the controller.

15. The information processing equipment according to claim 11, wherein a server device connected to a network and performing a predetermined process is coupled with the image formation apparatus.

16. Information processing equipment comprising:
a main body housing unit; and
a console panel provided at the main body housing unit, wherein:
the console panel has a front surface which has a display unit visible on the main body housing unit,
the console panel does not include at least a hard key for switching an operation mode to a maintenance mode,
the hard key is provided on a surface other than the front surface of the console panel,
the main body housing unit includes an enclosure portion enclosing the hard key,
the hard key has a surface to be pressed,
the enclosure portion has a plate-shaped portion that is transverse to a direction in which the hard key is pressed and that surrounds the hard key, and
a main surface of the plate-shaped portion facing an outside of the main body housing unit is flush with the surface to be pressed.

17. Information processing equipment comprising:
a main body housing unit; and
a console panel provided at the main body housing unit, wherein:
the console panel has a front surface which has a display unit visible on the main body housing unit,
the console panel does not include at least a hard key for switching an operation mode to a maintenance mode,
the hard key is provided on a surface other than the front surface of the console panel,
the main body housing unit includes an enclosure portion enclosing the hard key, and
the enclosure portion comprises:
a plate-shaped portion that is transverse to a direction in which the hard key is pressed and that surrounds the hard key;
a surrounding peripheral wall portion protruding from a peripheral portion of the plate-shaped portion; and
a closing portion closing an opening on a side of a tip end of the peripheral wall portion such that the closing portion can expose and close the opening.

18. Information processing equipment comprising:
a main body housing unit comprising a first housing unit and a second housing unit provided above the first housing unit; and
a console panel provided at the main body housing unit and comprising a front surface which includes a display screen that is visible from the main body housing unit,
wherein the console panel does not include at least a hard key for switching an operation mode to a maintenance mode, wherein a portion of an upper surface of the first housing unit opposes a portion of a lower surface of the second housing unit with a space therebetween, wherein the main body housing unit includes a recessed portion, the recessed portion being provided in the space between the portion of the upper surface of the first housing unit and the portion of the lower surface of the second housing, and wherein the hard key is provided to the portion of the lower surface of the second housing unit.

* * * * *